April 23, 1963 C. E. FIEGEL ETAL 3,086,482
TROLLEY
Filed Nov. 25, 1960 2 Sheets-Sheet 1
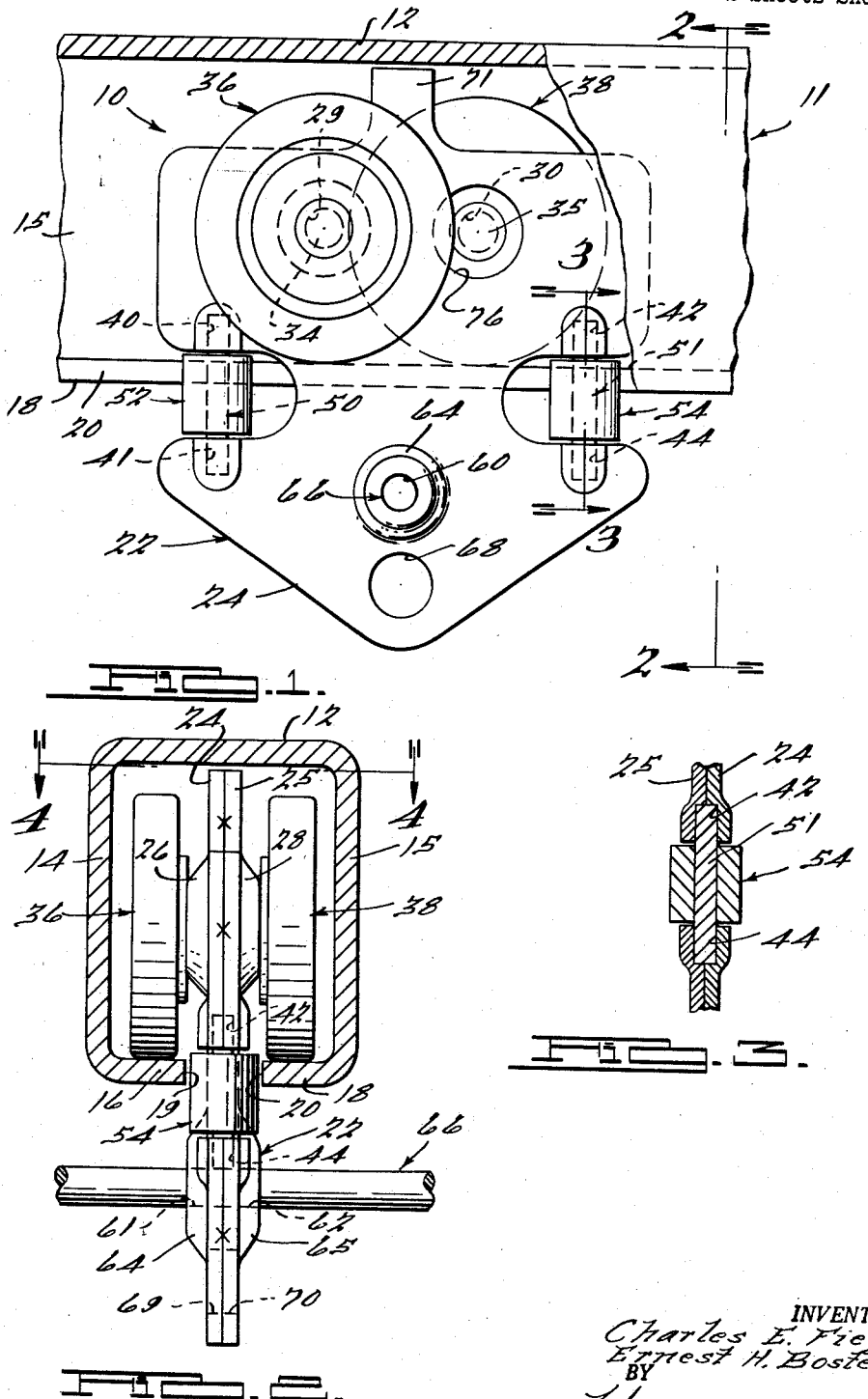
INVENTORS.
Charles E. Fiegel
Ernest H. Bostetter
BY
Harness, Dickey & Pierce
ATTORNEYS April 23, 1963 C. E. FIEGEL ETAL 3,086,482
TROLLEY
Filed Nov. 25, 1960 2 Sheets-Sheet 2
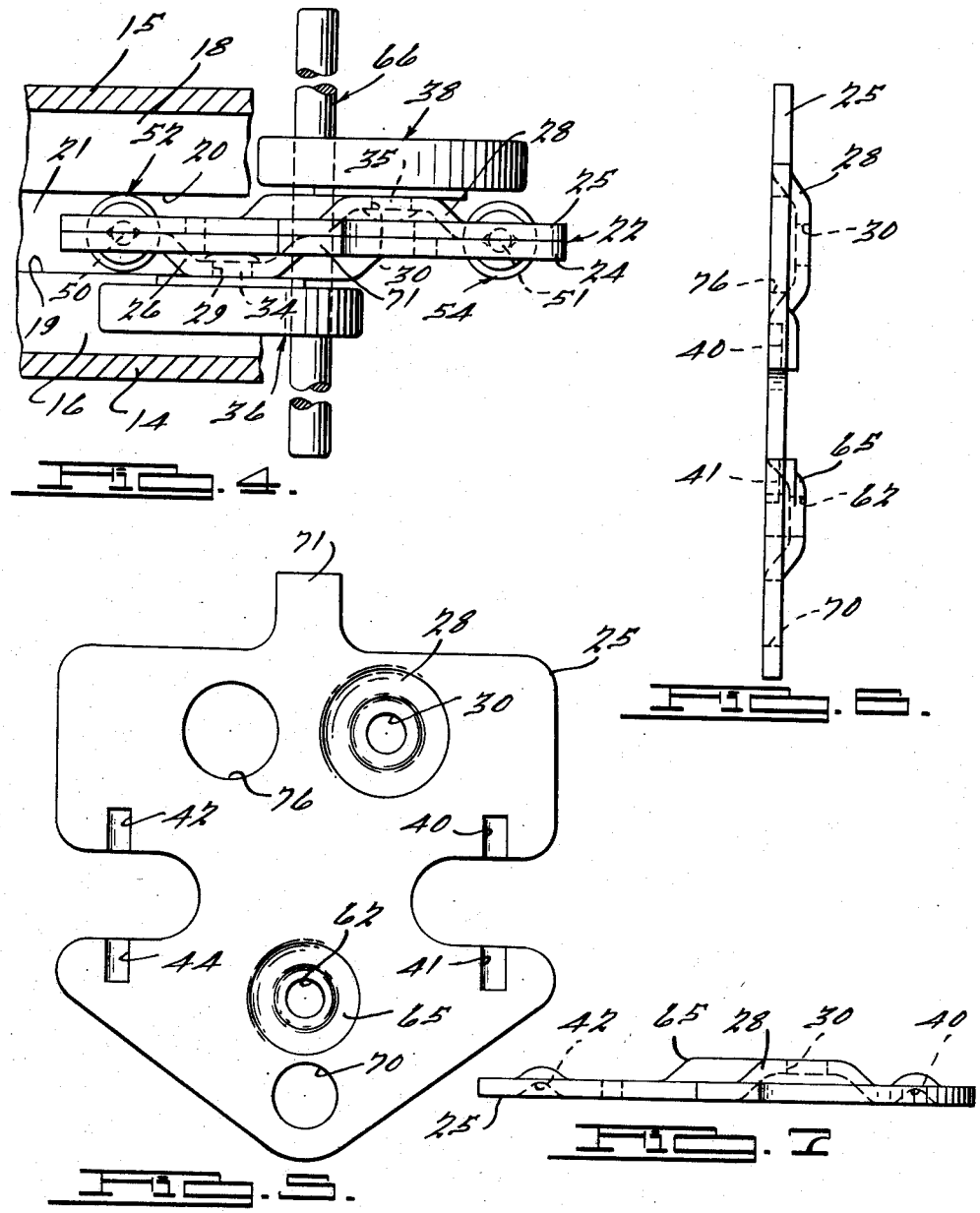
INVENTORS.
Charles E. Fiegel.
Ernest H. Bostetter.
BY
Harness, Dickey & Pierce.
ATTORNEYS.

United States Patent Office 3,086,482
Patented Apr. 23, 1963

3,086,482
TROLLEY
Charles E. Fiegel, Wayland, Mich., and Ernest H. Bostetter, Winthrop Harbor, Ill., assignors to Walker Manufacturing Company, a corporation of Delaware
Filed Nov. 25, 1960, Ser. No. 71,804
3 Claims. (Cl. 105—155)

This invention relates generally to overhead conveyors, and more particularly to a novel trolley for an overhead conveyor.

Overhead conveyors do work for which floor trucks and freight elevators are ordinarily required. They occupy no floor space, require relatively little power and provide a steady movement of parts from one operation to another and to final assembly, inspection and shipment. The trolleys ordinarily run on a continuous track that may connect several floors of one building or may connect several buildings. Articles are generally suspended from the trolleys and are processed while suspended, as, for example, in a dipping bath, baking oven, or other processing steps.

It is a principal object of the present invention to provide a trolley that is relatively simple in construction and therefore substantially less expensive than trolleys heretofore known and used.

It is desirable for the trolleys of an overhead conveyor to be restricted to movement in translation along the track to limit undesirable swinging of the workpiece. However, the individual trolleys of an overhead conveyor are generally mounted on wheels to reduce friction in the conveyor system to a minimum, thereby permitting a reduction in the size of the prime mover used to move the conveyor. Therefore, overhead conveyor trolleys heretofore known and used characteristically have required four wheels to effect stabilization about all axes of rotation. The use of four wheels for the purpose of stabilization has a two-fold disadvantage in that bearing friction is multiplied by the factor of four and the front and rear axles must be spaced apart a distance equal to the diameter of the wheels plus reasonable clearance space. Such spacing of the wheels restricts the ability of the trolley to negotiate relatively short radius turns in the track.

A trolley in accordance with the present invention satisfies the aforementioned requirement with respect to stabilization about all axes, and eliminates the problems heretofore attendant with multi-wheeled trolleys, namely, high frictional losses and an inability to negotiate short radius turns of the supporting track.

Accordingly, one object of the present invention is an improved trolley for a conveyor.

Another object is a trolley that is stabilized against rotation about any axis.

Another object is an improved trolley having only two wheels in load-carrying engagement with the track.

Another object is a trolley that is relatively simple in construction and easily fabricated.

Another object is a trolley that can easily negotiate short radius turns in the supporting track.

Another object is to provide a trolley that can be stacked along a free conveyor line and retain its stability.

Other objects and advantages of the present invention will be apparent from the following specification wherein reference is made to the drawings, in which:

FIGURE 1 is a side elevational view of a two-wheel trolley, in accordance with an exemplary embodiment of the present invention, shown in operative association with a track that is partially broken away for clarity;

FIG. 2 is a cross-sectional view taken substantially along the line 2—2 of FIG. 1;

FIG. 3 is a cross-sectional view taken substantially along the line 3—3 of FIG. 1;

FIG. 4 is a cross-sectional view taken substantially along the line 4—4 of FIG. 2;

FIG. 5 is a front elevational view of one-half of the trolley body;

FIG. 6 is a side elevation of the trolley body of FIG. 5; and

FIG. 7 is a top view of the trolley body of FIG. 5.

A trolley 10, in accordance with an exemplary embodiment of the present invention, is shown in operative association with a track 11. The track 11 comprises a continuous generally tubular member having a top wall 12, side walls 14 and 15, and a pair of inwardly directed bottom flanges 16 and 18. The bottom flanges 16 and 18 have spaced apart face portions 19 and 20, respectively, that define a longitudinally extending aperture 21 (FIG. 4).

The trolley 10 comprises a body member 22 formed from two identical symmetrical body sections 24 and 25 secured together in aligned, reversed, juxtaposed relation, as by welding. The sections 24 and 25 have axle support embossments 26 and 28 therein with central apertures 29 and 30 for the acceptance of a pair of axles 34 and 35, respectively. The axles 34 and 35 extend transversely outwardly of the sections 24 and 25 for the support of a pair of wheels 36 and 38, respectively, and are secured to the sections 24 and 25, as by riveting. The wheels 36 and 38 are engageable with the bottom flanges 16 and 18, respectively, of the track 11.

The body member 22 has two pairs of spaced aligned roller pin retainer recesses 40—41 and 42—44, for the acceptance of a pair of vertically disposed roller pins 50 and 51, respectively. The recesses 40—41 and 42—44 are defined by complementary embossments in each of the sections 24 and 25, which, when assembled in side-by-side relationship, cooperate to form the recesses 40—41 and 42—44. The vertical pins 50 and 51 support a pair of rollers 52 and 54, respectively, that are engageable with the face portions 19 and 20 of the longitudinally extending slot 21 in the track 11 to restrict rotation of the trolley 10 about a vertical axis as seen in the drawings.

The body member 22 has an aperture 60 extending therethrough defined by aligned apertures 61 and 62 in a pair of opposed embossments 64 and 65 in the sections 24 and 25, respectively. The aperture 60 supports a hanger rod 66 that extends transversely of the body member 22 for the support of an article (not shown). The embossments 64 and 65 space the apertures 61 and 62 so that the rod 66 is positively supported against rotation about any axis transverse thereof.

An aperture 68, defined by a pair of aligned apertures 69 and 70 in the body sections 24 and 25, respectively, is provided for the acceptance of a suitable drive chain (not shown).

The body member 22 may have an upwardly extending element 71 that may be used as a position stop to engage with suitable pawls (not shown) located at various positions on the track. Upward movement of the trolley is stopped by the conforming areas of wall 12 of track 11.

The sections 24 and 25 have cutouts 75 and 76 therein, respectively, to permit access to the wheel axles 35 and 34, respectively, to facilitate the application of a holding means to the axles 34 and 35, for example, riveting.

From the foregoing description it is apparent that the trolley 10 is stabilized against rotation with respect to the track 11 about all axes thereof. Stabilization about axes extending longitudinally of the track 11 is effected by the spacing of the planes of rotation of the wheels 36 and 38. Stabilization about a horizontal axis transverse of the track 11, as seen in the drawings, is effected by the spacing of the axles 34 and 35 of the wheels 36 and 38, respectively. Stabilization about a vertical axis, as seen in the drawings, is effected by the spacing of the vertical axes of rotation of the rollers 52 and 54.

It is to be noted that the spacing of the axles 34 and 35 of the wheels 36 and 38 is less than the diameter of the wheels 36 and 38. This is possible due to the placement of the wheels 36 and 38 on opposite sides of the body member 22. This spacing materially reduces the over-all length of the body member 22, permitting the body member to negotiate short radius turns in the track 11.

Accordingly, the trolley 10 presents a unique solution to the problems of stabilization and negotiation of short radius turns in the track 11. The trolley 10 is easily fabricated, reduces frictional losses to a minimum, and employes a minimum number of dissimilar structural components.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A trolley for supporting a load for movement longitudinally along a track, said trolley comprising a body member, first and second longitudinally and laterally staggered rotatable members on said body member engageable with the track in load transmitting relationship, said rotatable members being mounted on said body member so as to be the sole means for restricting rotation of said body member with respect to the track about a first axis parallel to the rotative axes of said members and about a second axis normal to said first axis and generally parallel to the direction of movement of said trolley, means for restricting rotation of said body member with respect to said track about a third axis normal to the first and second axes, and means for supporting a load spaced substantially equally between said rotatable members.

2. A trolley for supporting a load for longitudinal movement along a track, said trolley comprising a body member, first and second longitudinally and laterally staggered rotatable members on said body member engageable with the track in load transmitting relationship, means for the support of a load lying in a vertical plane extending midway between the axes of rotation of said rotatable members, said rotatable members being mounted on said body member so as to be the sole means for restricting rotation of said body member with respect to the track about first and second axes normal to one another, and a pair of rollers on said body member rotatable about a pair of axes normal to said first and second axes for restricting rotation of said body member with respect to said track about an axis normal to the first and second axes.

3. A trolley for supporting a load for longitudinal movement along a track, said trolley comprising a body member formed from first and second identical sections disposed in reversed juxtaposed relation, first and second longitudinally and laterally staggered wheels on said sections, means for the support of a load lying in a vertical plane extending midway between the rotative axes of said wheels, respectively, engageable with the track in load transmitting relationship, said wheels being mounted on said sections so as to be the sole means for restricting rotation of said body member with respect to the track about first and second axes normal to one another, and means for restricting rotation of said body member with respect to said track about a third axis normal to both the first and second axes.

References Cited in the file of this patent

FOREIGN PATENTS

| | | |
|---|---|---|
| 614,176 | Great Britain | Dec. 10, 1948 |
| 648,290 | Great Britain | Jan. 3, 1951 |
| 463,131 | Italy | Apr. 16, 1951 |